United States Patent [19]

Bradley et al.

[11] Patent Number: 4,896,696

[45] Date of Patent: Jan. 30, 1990

[54] FLOW CONTROL RESTRICTOR

[75] Inventors: Andrew H. Bradley, Van Wert, Ohio; Steven M. Knowles, Leslie; Frederick J. Pilon, Stockbridge, both of Mich.

[73] Assignee: Aeroquip Corporation, Jackson, Mich.

[21] Appl. No.: 374,850

[22] Filed: Jul. 3, 1989

[51] Int. Cl.$^4$ .............................................. F16K 21/02
[52] U.S. Cl. .................. 137/513.3; 137/528; 137/533.17
[58] Field of Search .................. 137/511, 513.3, 528, 137/533.17; 251/356

[56] References Cited

U.S. PATENT DOCUMENTS

| | | | |
|---|---|---|---|
| 2,550,373 | 4/1951 | Ortloff et al. ................ | 137/513.3 X |
| 3,661,175 | 5/1972 | Tillman ........................ | 137/513.3 X |
| 3,992,898 | 11/1976 | Duell et al. .................. | 137/513.3 X |
| 4,009,592 | 3/1977 | Boerger ........................ | 137/513.3 X |
| 4,080,988 | 3/1978 | Robertson ..................... | 137/513.3 |
| 4,263,787 | 4/1981 | Domingorena ............... | 137/513.3 X |
| 4,643,222 | 2/1987 | Wiser ............................. | 137/528 |
| 4,784,177 | 11/1988 | Sepso et al. .................. | 137/533.17 X |

Primary Examiner—John Rivell
Attorney, Agent, or Firm—Beaman & Beaman

[57] ABSTRACT

A restrictor for use in conduit systems, such as refrigeration and heat pump circuits for controlling the flow of fluid therein. The restrictor incorporates a unique shape to lower the operational noise normally generated by a restrictor without affecting the flow characteristics. Noise level is reduced by utilizing a specific configuration of the outer surfaces of the restrictor with respect to the direction of fluid flow.

8 Claims, 1 Drawing Sheet

U.S. Patent    Jan. 30, 1990    4,896,696
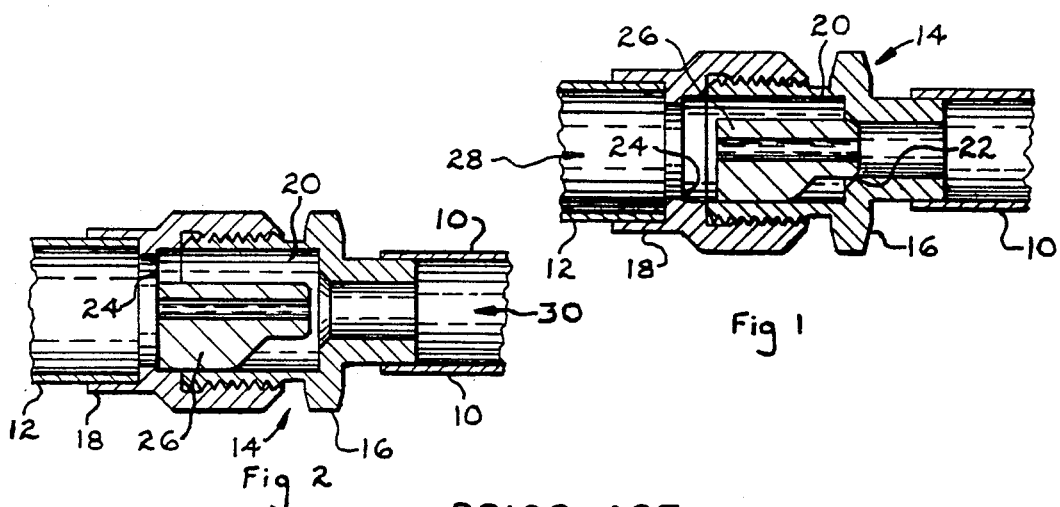
Fig 1
Fig 2
PRIOR ART
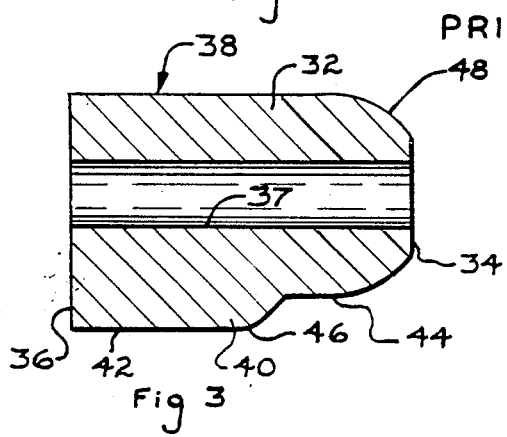
Fig 3
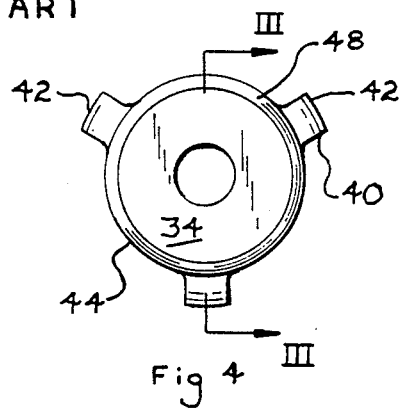
Fig 4
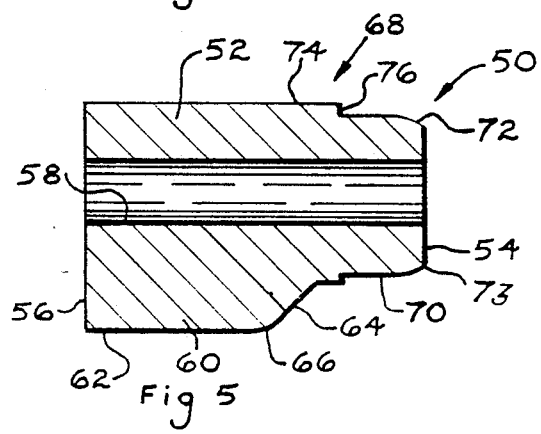
Fig 5
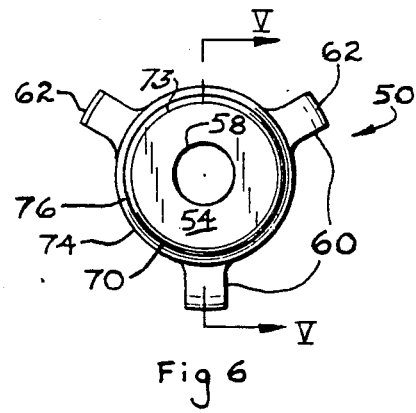
Fig 6
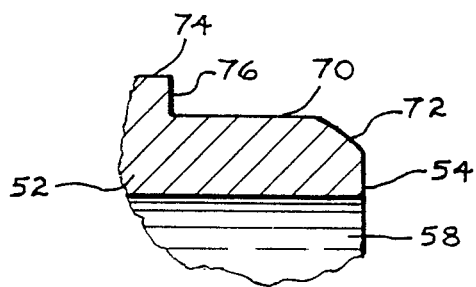
Fig 7 ately 4,896,696

FLOW CONTROL RESTRICTOR

BACKGROUND OF THE INVENTION

Fluid circuits, such those used in refrigeration and heat pump circuitry, may use a restrictor for controlling the flow through the conduit. The restrictor may be for the purpose of controlling the rate of flow in one direction and permitting unrestricted flow in the other direction.

As the fluid flow about the restrictor under high flow conditions may produce relatively high velocities adjacent the restrictor, and as the restrictor is freely mounted in its associating conduit, it is common for operational noises to be generated. Such noise may be in the form of a rattle, or other vibrations produced by the flow and turbulence of the fluid as it passes around and through the restrictor.

It is an object of the invention to provide a flow control restrictor for use with conduits wherein the operational noise level of the restrictor is substantially reduced as compared with prior art devices.

It is another object of the invention to provide a field-replaceable flow control restrictor for location within conduits wherein the operational noise level is reduced from known restrictor configurations, and wherein the restrictor configuration aids in maintaining the restrictor against its positioning anchor.

In use, a restrictor in accord with the invention is located within a conduit system such as employed in a refrigeration or heat pump circuit and the restrictor will be located intermediate an anchor or abutment and a seat whereby axial movement of the restrictor causes alternative engagement with the anchor or seat depending on the direction of fluid flow. Basically, the restrictor comprises a body of a generally elongated configuration having a first end and a second end located adjacent the anchor and an axial bore intersecting the body ends. A spider portion is defined adjacent to the body second end for radially locating and positioning the restrictor in the conduit, and the first end of the body constitutes a nose region of reduced diametrical dimension as compared to the spider portion. Depending on the direction of fluid movement fluid flow past the restrictor occurs through the spider portion and bore simultaneously or only through the body axial bore.

The flow of fluid is at its maximum when the circuit is in a heat pump heating cycle and as the fluid engages the first end of the body and flows over the nose region vibrations and frequency waves are created tending to produce operational noise or rattling of the restrictor. To reduce such operational noises the restrictor in accord with the invention incorporates a nose region having a cylindrical surface adjacent the restrictor first end which intersects the first end through a transitional spherical segment surface having a center of generation radially aligned with the body axial bore. This spherical segment surface is not tangential to either the nose cylindrical surface, or the nose first end, and the transitional spherical cylindrical surface segment reduces operational noise as compared to prior art restrictors wherein the transitional surface is tangential with the cylindrical nose surface.

Further, the restrictor nose region is provided with an annular radial shoulder adjacent the nose region and cylindrical surface which intersects with a cylindrical flow surface, which, in combination with the radial shoulder, alleviates generated noise. The shoulder radial face or surface is preferably perpendicularly disposed to the restrictor body axis and functions as a piston which aids in axially biasing the restrictor body into engagement with its anchor and reduces rattling and vibration of the restrictor against the anchor. Radial positioning of the restrictor is accomplished by vanes defined on the spider portion wherein the outer ends of the vanes define a periphery having a diametrical dimension only slightly less than the inner diameter of the conduit passage in which the restrictor is located.

BRIEF DESCRIPTION OF THE DRAWINGS

The aforementioned objects and advantages of the invention will be appreciated from the following description and the accompanying drawings wherein:

FIG. 1 is an elevational view, partially sectioned, illustrating a typical installation of a restrictor in a fluid conduit heat pump system in accord with the invention, the restrictor being shown in the air conditioning cycle position, FIG. 2 is a view similar to FIG. 1 showing the restrictor in the heat pump heating cycle position, FIG. 3 is a sectional view of a conventional prior art restrictor as taken along Section III—III of FIG. 4, FIG. 4 is an end view of the restrictor of FIG. 3 as taken from the right, FIG. 5 is an elevational, sectional view of a restrictor constructed in accord with the invention as taken along Section V—V of FIG. 6, FIG. 6 is an elevational view as taken from the right of FIG. 5 and FIG. 7 is an enlarged, detailed, elevational sectional view illustrating the nose region and the transitional surface of a restrictor constructed in accord with the invention.

DESCRIPTION OF THE PREFERRED EMBODIMENT

FIG. 1 illustrates a typical installation of a restrictor of the type of the invention in a heat pump conduit system. The conduit system includes conduits 10 and 12 interconnected by fitting 14 which is formed of two threadedly interconnectable halves 16 and 18.

The fitting 14 is a typical representation of a fitting wherein the field-replaceable restrictor may be utilized. The fitting half 16 is connected to the end of the conduit 10 by solder or the like, and the fitting includes a bore through which the refrigerant may flow. The outer end of fitting half 16 includes a cylindrical chamber 20 inwardly defined by a shoulder terminating in an annular sharp apex seat 22. Likewise, the coupling half 18 is affixed to the conduit 12 and this female part of the fitting 14 includes an annular radial anchor or shoulder surface 24. The restrictor 26 is located within the chamber 20 and is of a length less than that of chamber 20 so that the restrictor may be axially displaced within the chamber between alternative engagement with the seat 22 and the anchor surface 24 and the chamber 20 has a diameter about 0.002" larger than the maximum diameter of the restrictor vanes. When the circuit represented by conduits 10 and 12 is in an air conditioning cycle the fluid flow is toward the right as represented by arrow 28. When the circuit is in a heat pump heating cycle the fluid flow is toward the left as represented by arrow 30 in FIG. 2.

The form of conventional prior art flow restrictors is shown in FIGS. 3 and 4. Such a restrictor consists of an elongated body 32 which may be defined by a brass extrusion, molded or extruded synthetic plastic, or the like. The body includes a first end 34 disposed perpendicularly to the body longitudinal axis, and a second end surface 36 also perpendicular to the body length. A bore 37 intersects the ends 34 and 36. A spider peripheral region 38 is defined adjacent the end 36 and consists of three vanes 40 circumferentially spaced at 120° to each other each having an outer radial surface 42 defining a circumference slightly less than the chamber 20 with which the restrictor is associated so that the vane ends 42 engage the inner diameter of the chamber and radially locate the restrictor at the center of the chamber.

The body nose region comprises a cylindrical surface 44 of lesser diameter than the diameter of the vane ends 42 and the edge of the vanes toward nose region merges with the vane ends at a radius 46.

The body nose consists of the cylindrical surface 44, and a transition radius surface 48 tangential to the surface 44 intersects the body first end surface 34 as illustrated. The transition surface 48 comprises a spherical segment surface which is tangential to the nose surface 44 and non-tangential to the body end surface 34 as will be appreciated from FIG. 3.

The prior art restrictor as shown in FIGS. 3 and 4 is located in chamber 20 in a manner as will be apparent from FIG. 1. The body end 36 will be disposed toward the anchor surface 24, and the nose end 34 extends toward the seat 22. As apparent, the length of the body 32 is less than the length of the chamber.

When the restrictor body 32 is located within chamber 20 the transition surface 48 will sealingly engage the seat 22 when the restrictor has moved to the right as shown in FIG. 1 such as when the circuit is in an air conditioning cycle. Under such conditions all of the fluid flowing from conduit 12 to conduit 10 will have to flow through the restrictor bore 37, and usually, the cooling coils are connected to conduit 10 and the bore 37 will regulate the gaseous expansion in the coils. Restrictors with various sizes of bores are available to the installer, and a field-replaceable restrictor of this type permits the installer to "customize" the characteristics of the circuit.

When the circuit is in a heat pump heating cycle the flow of fluid is in the direction of arrow 30, and the restrictor body 32 will be moved to the left into engagement with the anchor surface 24 as shown in FIG. 2. Movement of the restrictor from the position of FIG. 1 to the position of FIG. 2 is due to the change in flow direction of the refrigerant and the engagement of the fluid with the body end 34. The inner diameter of the annular anchor surface 24 is only slightly less than the peripheral diameter of the vane end surfaces 42, and thus, fluid may readily flow through the restrictor spider region 38 between the vanes 40 into the conduit 12. Additionally the fluid would also flow through the bore 37. Thus, when the restrictor is in the position of FIG. 2 the restrictor produces only minimal restriction to fluid flow and fluid flow from conduit 10 to conduit 12 is substantially free and without restriction.

A restrictor constructed in accordance with the configuration of FIGS. 3 and 4 will produce operational noise during operation of the circuitry with which it is associated while in the mode shown in FIG. 2. While the reasons for the generation of such noise is not fully understood, it is believed that turbulence existing adjacent the transition surface 48, and the flow of the turbulence along the cylindrical surface 44 produces audible vibrations, and these vibrations will also cause an axial vibration or rattle as the restrictor body vibrates against the anchor surface 24. The restrictor body also rattles in the chamber 20 during the transition from the cooling mode to the heating mode.

The improved restrictor 50 of the invention is best illustrated in the FIGS. 5–7 wherein the restrictor includes an elongated body 52 having a first end 54 and a second end 56, both of which are perpendicularly disposed to the axis of the axial bore 58 which intersects the ends. Three radial vanes 60 are defined adjacent the edge 56 of the body disposed at 120° intervals about the circumference of the body and each includes an outer cylindrical segment end 62 defining a diameter slightly less than the inner diameter of the chamber 20 with which the restrictor is used. The forward edge of the vanes 60 includes the surface 64 and the surface 64 and the vane ends 62 merge at the radius 66.

As viewed in FIG. 5 the right portion of the body 52 constitutes a nose region 68, and the nose region includes a smaller diameter cylindrical surface 70 which intersects the body first end 54 by means of the spherical segment transition surface 72. The intersection of surface 72 and end 54 will define a circle 73. A larger diameter cylindrical flow surface 74 is defined on the body adjacent the vane surfaces 64 and an annular shoulder face 76 separates the surfaces 70 and 74. The shoulder face 76 is perpendicularly disposed to the axis of the bore 58 and includes a sharp edge at the intersection of the face 76 and surface 74.

To improve the audible operating characteristics of the restrictor of the invention the transition surface 72, while constituting a spherical segment portion, is not tangential to the surface 70, but rather intersects the cylindrical surface 70 at an obtuse angle as is readily appreciated from FIG. 7. In the commercial embodiment of the invention the radius of the transition surface 72 is larger than the radius of the surface 70. Also, the radius of surface 72 is substantially equal to the radius of surface 74 which is about 0.105 inches and the radial dimension of face 76 is about 0.010 inches.

The presence of the shoulder face 76, and the larger diameter of the flow surface 74 than the nose surface 70, and the non-tangential relationship of surface 72 to surface 70 and end 54, and the dimensional relationship of circle 73, produces fluid flow characteristics over the nose region 68 of the body 52 when the resistor 50 is in the mode of FIG. 2 which reduces audible vibrations as compared with the embodiment of FIGS. 3 and 4, and lowers the operational noise and rattle experienced with prior art restrictors. This noise reduction is due to the dimensional relationships between the surfaces engaged by the fluid, and the face 76 controls turbulence created at surfaces 72 and 70. Also, the presence of the shoulder face 76 helps function as a "piston" to provide a resistance surface to aid in the biasing of the restrictor to the left, FIG. 2, under the influence of the fluid flow to maintain engagement of the restrictor with the anchor surface 24 to reduce rattling.

As the dimensional relationships and ratios of the invention are of important significance, as way of example the following approximate dimensions exist with a restrictor having a maximum diameter as determined by the vane surfaces 62 of approximately 0.277 inches and the chamber 20 diameter is approximately 0.279 inches.

Length of body 52: 0.374"
Diameter of surface 70: 0.190"

Diameter of surface 74: 0.210"
Radius of surface 72: 0.105"
Diameter of circle 73: 0.170"
Distance from center of surface 72 to end 54: 0.061"
Distance from end 54 to face 76: 0.086"

The restrictor 50 is located within chamber 20 and operates in the manner previously described. When the circuit is in the air conditioning mode of FIG. 1 the transition surface 72 will seal against seat 22, and when the circuit is in the heat pump heat mode of FIG. 2 the surface 24 will position the restrictor in the chamber and fluid flow occurs over the surfaces 72, 70, 76, and 74.

The restrictor of the invention is field-replaceable and may be readily substituted in existing conduit systems for the prior art type restrictors and restrictors of different diameter of bores may be easily substituted to suit a particular circuit, and it is appreciated that various modifications to the inventive concepts may be apparent to those skilled in the art without departing from the spirit and scope of the invention.

What is claimed:

1. A flow control restrictor characterized by its low operational noise level comprising, in combination, an elongated body having a longitudinal axis, a first end surface, a nose region adjacent said first end surface, a peripheral spider region having a radius, a second end surface and an axial bore intersecting said first and second end surfaces, said first end surface being substantially planar and substantially perpendicular to said axis, said nose region including a cylindrical nose surface having a radius and a convex transition surface constituting the intersection of said first end surface and said nose surface having a radius, said transition surface comprising a segment of a sphere having its center upon said longitudinal axis and a radius greater than the radius of said nose surface.

2. In a flow control restrictor characterized by its low operational noise level as in claim 1, said transition surface spherical segment being non-tangential to said first end surface.

3. In a flow control restrictor characterized by its low operational noise level as in claim 1, an annular radial extending flow modifying face defined on said nose region axially spaced from said first end surface.

4. In a flow control restrictor characterized by its low operational noise level as in claim 3, said face comprising a shoulder having a radial annular face disposed toward said first end surface.

5. In a flow control restrictor characterized by its low operational noise level as in claim 4, said shoulder radial annular face being substantially perpendicular to said body longitudinal axis.

6. In a flow control restrictor characterized by its low operational noise level as in claim 5, a cylindrical flow surface defined on said nose region adjacent said face and located between said face and said spider region having a radius greater than the radius of said nose surface.

7. In a flow control restrictor characterized by its low operational noise level as in claim 6, the center of said transition surface being in radial alignment with said nose surface and the radius of said transition surface being substantially equal to the radius of said flow surface.

8. In a flow control restrictor characterized by its low operational noise level as in claim 5, said nose surface having a diameter of approximately 0.190", said flow surface having a diameter of approximately 0.210", said transition surface having a radius of approximately 0.105", said face being axially spaced from said first end surface approximately 0.086" and the intersection of said transition surface and said first end surface defining a circle having a diameter approximately 0.170".

* * * * *